(12) United States Patent
Lee et al.

(10) Patent No.: US 10,469,870 B2
(45) Date of Patent: *Nov. 5, 2019

(54) METHOD AND APPARATUS FOR PREDICTING AND RESTORING A VIDEO SIGNAL USING PALETTE ENTRY

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/511,673

(22) PCT Filed: Sep. 25, 2015

(86) PCT No.: PCT/KR2015/010213
§ 371 (c)(1),
(2) Date: Mar. 16, 2017

(87) PCT Pub. No.: WO2016/048092
PCT Pub. Date: Mar. 31, 2016

(65) Prior Publication Data
US 2017/0310992 A1 Oct. 26, 2017

(30) Foreign Application Priority Data

Sep. 26, 2014 (KR) .................. 10-2014-0128838
Sep. 26, 2014 (KR) .................. 10-2014-0128839
(Continued)

(51) Int. Cl.
*H04N 19/593* (2014.01)
*G06T 11/00* (2006.01)
(Continued)

(52) U.S. Cl.
CPC .......... *H04N 19/593* (2014.11); *G06T 11/001* (2013.01); *H04N 19/176* (2014.11);
(Continued)

(58) Field of Classification Search
None
See application file for complete search history.

(56) References Cited

U.S. PATENT DOCUMENTS 5,883,633 A * 3/1999 Gill .................. G06T 9/005
345/589
9,749,628 B2 * 8/2017 Chuang .................. H04N 19/70
(Continued)

FOREIGN PATENT DOCUMENTS

AU         2009243440 A1    6/2011
CN         1452397 A       10/2003
(Continued)

OTHER PUBLICATIONS

Jianle Chen et al., "Description of screen content coding technology proposal by Qualcomm", JCTVC-Q0031, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, pp. 1-19.
(Continued)

*Primary Examiner* — Tyler W. Sullivan
(74) *Attorney, Agent, or Firm* — IP Legal Services, LLC

(57) ABSTRACT

Provided is a method for decoding a video signal. Such a method may include constructing a palette map for a current block encoded in a plate mode, the palette map comprises at least one palette entry and a map index that for identifying the palette entry, deriving a palette index according to a predetermined scan order of the current block on a sample-by-sample basis, and reconstructing each sample of the current block by using a palette entry having a map index of
(Continued)

the same value as the derived palette index from the palette map.

10 Claims, 9 Drawing Sheets

(30) Foreign Application Priority Data

| Oct. 1, 2014 | (KR) | 10-2014-0132464 |
|---|---|---|
| Oct. 1, 2014 | (KR) | 10-2014-0132465 |
| Oct. 1, 2014 | (KR) | 10-2014-0132466 |
| Oct. 1, 2014 | (KR) | 10-2014-0132467 |
| Oct. 1, 2014 | (KR) | 10-2014-0132468 |
| Oct. 1, 2014 | (KR) | 10-2014-0132469 |

(51) Int. Cl.
*H04N 19/80* (2014.01)
*H04N 19/70* (2014.01)
*H04N 19/176* (2014.01)
*G06F 3/147* (2006.01)

(52) U.S. Cl.
CPC ........... *H04N 19/80* (2014.11); *G06F 3/1475* (2013.01); *H04N 19/70* (2014.11)

(56) References Cited

U.S. PATENT DOCUMENTS

| 9,942,551 | B2* | 4/2018 | Karczewicz | H04N 19/70 |
|---|---|---|---|---|
| 2003/0161541 | A1 | 8/2003 | Ridge | |
| 2003/0198291 | A1 | 10/2003 | Gold | |
| 2003/0198292 | A1 | 10/2003 | Gold | |
| 2004/0067041 | A1 | 4/2004 | Seo et al. | |
| 2005/0237951 | A1 | 10/2005 | Yang et al. | |
| 2008/0030517 | A1 | 2/2008 | Chuang | |
| 2008/0144952 | A1 | 6/2008 | Chen et al. | |
| 2008/0273804 | A1 | 11/2008 | Malewski | |
| 2009/0010533 | A1 | 1/2009 | Hung | |
| 2009/0232394 | A1 | 9/2009 | Yang et al. | |
| 2011/0044542 | A1 | 2/2011 | Kuwahara | |
| 2011/0064131 | A1 | 3/2011 | Park et al. | |
| 2011/0064132 | A1 | 3/2011 | Park et al. | |
| 2011/0064133 | A1 | 3/2011 | Park et al. | |
| 2011/0064324 | A1 | 3/2011 | Park et al. | |
| 2011/0064325 | A1 | 3/2011 | Park et al. | |
| 2011/0110416 | A1 | 5/2011 | Lawrence | |
| 2011/0112667 | A1 | 5/2011 | Lawrence | |
| 2011/0170771 | A1 | 7/2011 | Yang et al. | |
| 2011/0279474 | A1 | 11/2011 | Yang et al. | |
| 2012/0301022 | A1 | 11/2012 | Yang et al. | |
| 2013/0114676 | A1 | 5/2013 | Guo et al. | |
| 2013/0114738 | A1 | 5/2013 | Chien et al. | |
| 2013/0188707 | A1 | 7/2013 | Shimizu et al. | |
| 2014/0192866 | A1 | 7/2014 | Cohen et al. | |
| 2014/0301474 | A1 | 10/2014 | Guo et al. | |
| 2014/0301475 | A1 | 10/2014 | Guo et al. | |
| 2015/0010053 | A1 | 1/2015 | Xu et al. | |
| 2015/0016501 | A1* | 1/2015 | Guo | G06T 9/00 |
| | | | | 375/240.02 |
| 2015/0264365 | A1 | 9/2015 | Tsai et al. | |
| 2015/0281728 | A1* | 10/2015 | Karczewicz | H04N 19/93 |
| | | | | 375/240.16 |
| 2015/0312568 | A1* | 10/2015 | Lainema | H04N 19/70 |
| | | | | 375/240.02 |
| 2015/0341674 | A1* | 11/2015 | Seregin | H04N 19/105 |
| | | | | 375/240.12 |
| 2016/0037164 | A1 | 2/2016 | Joshi et al. | |
| 2016/0057434 | A1* | 2/2016 | Lai | H04N 19/176 |
| | | | | 382/233 |
| 2016/0094851 | A1* | 3/2016 | Pu | H04N 19/91 |
| | | | | 375/240.24 |
| 2016/0100179 | A1* | 4/2016 | He | H04N 19/176 |
| | | | | 375/240.25 |
| 2016/0105676 | A1* | 4/2016 | Pu | H04N 19/13 |
| | | | | 375/240.24 |
| 2016/0227217 | A1 | 8/2016 | Karczewicz et al. | |
| 2016/0227239 | A1 | 8/2016 | Pu et al. | |
| 2016/0227254 | A1 | 8/2016 | Karczewicz et al. | |
| 2016/0286217 | A1 | 9/2016 | Hsiang | |
| 2016/0309177 | A1* | 10/2016 | Laroche | H04N 19/105 |
| 2016/0309183 | A1* | 10/2016 | Sun | H04N 19/593 |
| 2016/0323584 | A1 | 11/2016 | Chuang et al. | |
| 2016/0345030 | A1* | 11/2016 | Karczewicz | H04N 19/176 |
| 2017/0127058 | A1* | 5/2017 | Misra | H04N 19/70 |
| 2017/0295376 | A1 | 10/2017 | Lee et al. | |
| 2017/0302937 | A1* | 10/2017 | Lee | H04N 19/103 |
| 2017/0347114 | A1* | 11/2017 | Lee | H04N 19/50 |
| 2017/0374366 | A1 | 12/2017 | Xiu et al. | |
| 2018/0020236 | A1* | 1/2018 | Lee | H04N 19/70 |
| 2018/0020237 | A1* | 1/2018 | Lee | H04N 19/186 |
| 2018/0098092 | A1 | 4/2018 | Ye et al. | |
| 2018/0098093 | A1 | 4/2018 | Ye et al. | |
| 2018/0109798 | A1* | 4/2018 | Lee | H04N 19/00 |
| 2018/0205951 | A1* | 7/2018 | Hsiang | H04N 19/70 |
| 2019/0174130 | A1* | 6/2019 | Hsiang | H04N 19/91 |
| 2019/0182490 | A1 | 6/2019 | Lee et al. | |

FOREIGN PATENT DOCUMENTS

| CN | 1602517 A | 3/2005 |
|---|---|---|
| CN | 101065779 A | 10/2007 |
| CN | 101340587 A | 1/2009 |
| CN | 102088604 A | 6/2011 |
| CN | 102523367 A | 6/2012 |
| CN | 102833463 A | 12/2012 |
| CN | 103119941 A | 5/2013 |
| CN | 106797473 A | 5/2017 |
| CN | 107079151 A | 8/2017 |
| CN | 107079163 A | 8/2017 |
| JP | 2012-074918 A | 4/2012 |
| KR | 10-2011-0011505 A | 2/2011 |
| KR | 10-2014-0098120 A | 8/2014 |
| WO | 2012/043294 A1 | 4/2012 |
| WO | 2013/070610 A1 | 5/2013 |
| WO | 2016/161967 A1 | 10/2016 |

OTHER PUBLICATIONS

Shin-Ta Hsiang et al., "Run coding of the palette index map using a universal entropy coding scheme", JCTVC-R0136, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-7.
Guillaume Laroche et al., "AhG10:Run coding for palette mode", JCTVC-Q0066, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, pp. 1-2.
Liwei Guo et al., "Palette Mode for Screen Content Coding", JCTVC-M0323, Joint Collaborative Team on Video coding (JCT-VC) of ITU-T SG 16 WP 3 and ISO/IEC JTC 1/SC 29/WG 11, 13th Meeting: Incheon, KR, Apr. 18-26, 2013, pp. 1-5.
Liwei Guo et al., "Color Palette for Screen Content Coding", 2014 IEEE ICIP, Oct. 27-30, 2014, pp. 5556-5560.
Zhan MA et al., "Advanced Screen Content Coding Using Color Table and Index Map", IEEE Transactions on Image Processing, Oct. 2014, pp. 4399-4412, vol. 23, No. 10.
Vadim Seregin et al., "Non-SCCE3: Run-length coding for palette predictor", JCTVC-R0228, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-3.
Wei Pu et al., "Non-CE6: Improvement on Palette Sharing Mode", JCTVC-S0108r1, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-3.
Rajan Joshi et al., "CE6 subtest A.5: Contexts for run coding in palette mode", JCTVC-S0038, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-7.

(56) References Cited

OTHER PUBLICATIONS

Seung-Hwan Kim et al., "Non-SCCE3: High throughput palette coding", CTVC-R0232, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-7.

Wei Pu et al., "Non-CE6: Syntax Redundancy Fixes for Palette Mode", JCTVC-S0110r1, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-8.

Rajan Joshi et al., "High Efficiency Video Coding (HEVC) Screen Content Coding: Draft 1", JCTVC-R1005-v3, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-360.

Liwei Guo et al., "Evaluation of Palette Mode Coding on HM-12.0+RExt-4.1", JCTVC-O0218, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, pp. 1-7.

Rajan Joshi et al., "High Efficiency Video Coding (HEVC) Screen Content Coding: Draft 2", Document: JCTVC-S1005, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-350.

Yu-Chen Sun et al., "CE1-related: Harmonization between JCTVC-T0065 Non CE1: Grouping Palette Indices at Front and CE1 Test A.1.5", Document: JCTVC-T0233, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-6.

Yuwen HE et al., "Non-CE1: On palette sharing mode", JCTVC-T0206, Joint Collaborative Team on Video Coding (JCT-VC) of ITU-T SG16 WP3 and ISO/IEC JTC1/SC29/WG11, 20th Meeting: Geneva, CH, Feb. 10-18, 2015, pp. 1-5.

Rajan Joshi et al., "High Efficiency Video Coding (HEVC) Screen Content Coding: Draft 3", JCTVC-T1005, Joint Collaborative Team on Video Coding (JCT-VC) of ITU-T SG 16 WP 3 and ISO/IEC JTC 1/SC 29/WG 11, 20th Meeting: Geneva, CH, Feb. 10-Feb. 17, 2015, pp. 1-563.

Marta Karczewicz et al., "Non CE1: Grouping Palette Indices at Front", JCTVC-T0065r2, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-3.

Vadim Seregin, "Non-CE6: Cross-check of removal of parsing dependency in palette-based coding (JCTVC-S0181)", Document: JCTVC-S0256, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-3.

Xiaoyu Xiu et al., "Non-CE6: Unification of coding of escape indices and other palette indices", Document: JCTVC-S0258, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-7.

Xiaozhong Xu et al., "CE1-related: escape pixel coding in palette mode", Document: JCTVC-T0076, Joint Collaborative Team on Video Coding (JCT-VC) of ITU-T SG 16 WP 3 and ISO/IEC JTC 1/SC 29/WG 11, 20th Meeting: Geneva, CH, Feb. 10-18, 2015, pp. 1-9.

Rajan Joshi et al., "High Efficiency Video Coding (HEVC) Screen Content Coding: Draft 2", Document: JCTVC-S1005, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-7.

Seung-Hwan Kim et al., "Non-SCCE3: High throughput palette coding", Document: JCTVC-R0232, Joint Collaborative Team on Video Coding (JCT-VC) of ITU-T SG 16 WP 3 and ISO/IEC JTC 1/SC 291WG 11, 18th Meeting: Sapporo, JP, Jun. 30-Jul. 9, 2014, pp. 1-7.

\* cited by examiner

FIG. 6

| palette_coding(x0,y0,nCbS){ | Descriptor |
|---|---|
| ... | |
| numPredPreviousPalette=0 | |
|   for(idx=0;idx<previous_palette_size;<br>    idx++){ | |
|     previous_palette_entry_flag[idx] | ae(v) |
|     if (previous_palette_entry_flag[idx]){ | |
|       last_previous_entry_flag | ae(v) |
|       if (last_previous_entry_flag) | |
|         idx = previous_palette_size | |
|       for(cIdx = 0;cIdx < 3;cIdx++) | |
|         palette_entries[cIdx][numPredPreviousPalette]=<br>        previousPaletteEntries[cIdx][idx] | |
|       numPredPreviousPalette++ | |
|     ... | |
|     } | |
|   } | |
| if(numPredPreviousPalette < max_palette_size) | |
|   palette_num_signalled_entries | ae(v) |
|   for(cIdx = 0;cIdx < 3;cIdx++) | |
|     for(i=0; i < palette_num_signalled_entries; i++) | |
|       palette_entries[cIdx][numPredPreviousPalette+i] | ae(v) |
|   palette_size = numPredPreviousPalette + palette_num_signalled_entries | |
| } | |
| ... | |
| } | |

S600 → previous_palette_entry_flag[idx]
S610 → last_previous_entry_flag
S620 → idx = previous_palette_size

| Palette index | Run |
|---|---|
| 0 | 1 |
| 1 | 2 |
| 0 | 0 |
| 1 | 3 |
| 0 | 1 |
| 1 | 1 |
| 0 | 2 |

FIG. 10

| | palette_coding(x0,y0,nCbS){ | Descriptor |
|---|---|---|
| | ... | |
| S1000 | one_palette_entry_flag | ae(v) |
| | if(one_palette_entry_flag){ | |
| |   for(cIdx=0;cIdx < 3;cIdx++) | |
| |     palette_entries[cIdx][0] | ae(v) |
| | }else{ | |
| | ... | |
| | numPredPreviousPalette=0 | |
| | num_previous_palette_entry | ae(v) |
| | if(num_previous_palette_entry){ | |
| |   for(idx=0;idx < previous_palette_size;idx++){ | |
| |     previous_palette_entry_flag[idx] | ae(v) |
| |     if(previous_palette_entry_flag[idx]){ | |
| |       for(cIdx=0;cIdx < 3;cIdx++) | |
| |         palette_entries[cIdx][numPredPreviousPalette]= previousPaletteEntries[cIdx][idx] | |
| |       numPredPreviousPalette++ | |
| |       if(num_previous_palette_entry==numPredPreviousPalette) | |
| |         idx=previous_palette_size | |
| |       ... | |
| |     } | |
| |   } | |
| | } | |
| | if(numPredPreviousPalette < max_palette_size) | |
| S1010 |   palette_num_signalled_entries | ae(v) |
| |   for(cIdx=0;cIdx < 3;cIdx++) | |
| |     for(i=0;i < palette_num_signalled_entries;i++) | |
| |       palette_entries[cIdx][numPredPreviousPalette+i] | ae(v) |
| | if(num_previous_palette_entry!=0) | |
| S1020 | palette_size=numPredPreviousPalette+palette_num_signalled_entries | |
| | else | |
| S1030 |   palette_size=palette_num_signalled_entries+2 | |
| | ... | |
| | } | |

METHOD AND APPARATUS FOR PREDICTING AND RESTORING A VIDEO SIGNAL USING PALETTE ENTRY

CROSS REFERENCE TO RELATED APPLICATIONS

This application is a National Stage Patent Application of PCT International Patent Application No. PCT/KR2015/010213 (filed on Sep. 25, 2015) under 35 U.S.C. § 371, which claims priority to Korean Patent Application Nos. 10-2014-0128838 (filed on Sep. 26, 2014), 10-2014-0128839 (filed on Sep. 26, 2014), 10-2014-0132464 (filed on Oct. 1, 2014), 10-2014-0132465 (filed on Oct. 1, 2014), 10-2014-0132466 (filed on Oct. 1, 2014), 10-2014-0132467 (filed on Oct. 1, 2014), 10-2014-0132468 (filed on Oct. 1, 2014), and 10-2014-0132469 (filed on Oct. 1, 2014), the teachings of which are incorporated herein in their entireties by reference.

TECHNICAL FIELD

The present invention relates to a method and a device for processing a video signal.

BACKGROUND ART

Demands for high-resolution, high-quality images such as High Definition (HD) images and Ultra High Definition (UHD) images have recently increased in various fields of applications. As video data has a higher resolution and higher quality, the video data is larger in amount than traditional video data. Therefore, if video data is transmitted on an existing medium such as a wired/wireless wideband circuit or stored in an existing storage medium, transmission cost and storage cost increase. To avert these problems encountered with higher-resolution, higher-quality video data, high-efficiency video compression techniques may be used.

There are a variety of video compression techniques including inter-picture prediction in which pixel values included in a current picture are predicted from a picture previous to or following the current picture, intra-picture prediction in which pixel values included in a current picture are predicted using pixel information in the current picture, and entropy encoding in which a short code is assigned to a more frequent value and a long code is assigned to a less frequent value. Video data may be compressed effectively and transmitted or stored, using such a video compression technique.

Along with the increasing demands for high-resolution videos, demands for three-dimensional (3D) video content as a new video service have been increasing. A video compression technique for effectively providing HD and UHD 3D video content is under discussion.

DISCLOSURE

Technical Problem

An object of the present invention is to provide a method and apparatus for predicting or restoring a video signal based on a palette mode in encoding/decoding a video signal.

An object of the present invention is to provide a method and apparatus for constructing a palette map of a block to be encoded/decoded in encoding/decoding a video signal.

An object of the present invention is to provide a method and apparatus for deriving a palette index of a block to be encoded/decoded in encoding/decoding a video signal.

Technical Solution

A method for decoding a video signal according to the present invention comprises constructing a palette map for a current block encoded in a palette mode, deriving a palette index according to a predetermined scanning order in units of a sample of the current block, and restoring each sample of the current block by using a palette entry with a map index equal to the palette index derived from the palette map.

In the method for decoding a video signal according to the present invention, the palette map may include at least one palette entry and a map index that identifies the palette entry.

In the method for decoding a video signal according to the present invention, the palette entry may include at least one of a predicted palette entry or a signaled palette entry.

In the method for decoding a video signal according to the present invention, the predicted palette entry may mean a palette entry reused in the current block among the palette entries included in the palette map of the previous block, and the signaled palette entry may mean a palette entry not included in the palette map of the previous block, among the palette entries used by the current block.

In the method for decoding a video signal according to the present invention, the predetermined scanning order may be either a horizontal traverse scan or a vertical traverse scan.

In the method for decoding a video signal according to the present invention, the horizontal traverse scan is a method in which an odd row of the current block is scanned from left to right, and an even row is scanned from right to left. The vertical traverse scan is a method in which an odd column of the current block is scanned from top to bottom and an even column is scanned from bottom to top.

In the method for decoding a video signal according to the present invention, the palette index is derived using at least one of an index mode (INDEX MODE) and a copy mode (COPY MODE).

In the method for decoding a video signal according to the present invention, the INDEX MODE is a method of deriving a palette index based on encoded palette index information, and the COPY MODE is a method of deriving a palette index of the current sample by using a palette index of a neighboring sample adjacent to the current sample.

In the method of decoding a video signal according to the present invention, when at least one sample of the current block uses an index mode, a palette index for at least one sample of the current block is derived by using the encoded palette index information and an encoded palette index run.

In the method of decoding a video signal according to the present invention, the palette index run indicates the number of times the same palette index is repeated.

In the method of decoding a video signal according to the present invention, in the step of restoring each sample of the current sample, when the value of the derived palette index relating to the current sample is equal to the number of palette entries in the palette map of the current block, the current sample is restored based on an escape mode (ESCAPE MODE).

In the method of decoding a video signal according to the present invention, the escape mode is a method of restoring a sample value based on a palette escape value which is additionally signaled, without using a palette entry of the configured palette map.

In the method of decoding a video signal according to the present invention, the escape mode is adaptively used based on the number of palette entries in the palette map of the current block.

In the method of decoding a video signal according to the present invention, when the number of palette entries in the palette map of the current block is greater than 0, it is allowed to restore at least one sample of the current block based on the escape mode. It is not allowed to restore the current block based on the escape mode when the number of palette entries in the palette map of the current block is equal to 0.

An apparatus for decoding a video signal according to the present invention comprises a restoring unit configured to construct a palette map for a current block encoded in a palette mode, derive a palette index according to a predetermined scanning order in units of a sample of the current block, and restore each sample of the current block by using a palette entry with a map index equal to the palette index derived from the palette map.

In the apparatus for decoding a video signal according to the present invention, the palette map may include at least one palette entry and a map index that identifies the palette entry.

In the apparatus for decoding a video signal according to the present invention, the palette entry may include at least one of a predicted palette entry or a signaled palette entry.

In the apparatus for decoding a video signal according to the present invention, the predicted palette entry may mean a palette entry reused in the current block among the palette entries included in the palette map of the previous block, and the signaled palette entry may mean a palette entry not included in the palette map of the previous block, among the palette entries used by the current block.

In the apparatus for decoding a video signal according to the present invention, the predetermined scanning order may be either a horizontal traverse scan or a vertical traverse scan.

In the apparatus for decoding a video signal according to the present invention, the horizontal traverse scan is a method in which an odd row of the current block is scanned from left to right, and an even row is scanned from right to left. The vertical traverse scan is a method in which an odd column of the current block is scanned from top to bottom and an even column is scanned from bottom to top.

In the apparatus for decoding a video signal according to the present invention, the restoring unit may derive the palette index using at least one of an index mode (INDEX MODE) and a copy mode (COPY MODE).

In the apparatus for decoding a video signal according to the present invention, the INDEX MODE is a method of deriving a palette index based on encoded palette index information, and the COPY MODE is a method of deriving a palette index of the current sample by using a palette index of a neighboring sample adjacent to the current sample.

In the apparatus of decoding a video signal according to the present invention, the restoring unit may derive a palette index for at least one sample of the current block by using the encoded palette index information and an encoded palette index run when at least one sample of the current block uses an index mode.

In the apparatus of decoding a video signal according to the present invention, the palette index run indicates the number of times the same palette index is repeated.

In the apparatus of decoding a video signal according to the present invention, the restoring unit may restore the current sample based on an escape mode (ESCAPE MODE) when the value of the derived palette index relating to the current sample is equal to the number of palette entries in the palette map of the current block.

In the apparatus of decoding a video signal according to the present invention, the escape mode is a method of restoring a sample value based on a palette escape value which is additionally signaled, without using a palette entry of the configured palette map.

In the apparatus of decoding a video signal according to the present invention, the escape mode is adaptively used based on the number of palette entries in the palette map of the current block.

In the apparatus of decoding a video signal according to the present invention, when the number of palette entries in the palette map of the current block is greater than 0, it is allowed to restore at least one sample of the current block based on the escape mode. It is not allowed to restore the current block based on the escape mode when the number of palette entries in the palette map of the current block is equal to 0.

A method for encoding a video signal according to the present invention comprises constructing a palette map for a current block encoded in a palette mode, deriving a palette index according to a predetermined scanning order in units of a sample of the current block, and restoring each sample of the current block by using a palette entry with a map index equal to the palette index derived from the palette map.

In the method for encoding a video signal according to the present invention, the palette map may include at least one palette entry and a map index that identifies the palette entry.

In the method for encoding a video signal according to the present invention, the palette entry may include at least one of a predicted palette entry or a signaled palette entry.

In the method for encoding a video signal according to the present invention, the predicted palette entry may mean a palette entry reused in the current block among the palette entries included in the palette map of the previous block, and the signaled palette entry may mean a palette entry not included in the palette map of the previous block, among the palette entries used by the current block.

In the method for encoding a video signal according to the present invention, the predetermined scanning order may be either a horizontal traverse scan or a vertical traverse scan.

In the method for encoding a video signal according to the present invention, the horizontal traverse scan is a method in which an odd row of the current block is scanned from left to right, and an even row is scanned from right to left. The vertical traverse scan is a method in which an odd column of the current block is scanned from top to bottom and an even column is scanned from bottom to top.

In the method for encoding a video signal according to the present invention, the palette index is derived using at least one of an index mode (INDEX MODE) and a copy mode (COPY MODE).

In the method for encoding a video signal according to the present invention, the INDEX MODE is a method of deriving a palette index based on encoded palette index information, and the COPY MODE is a method of deriving a palette index of the current sample by using a palette index of a neighboring sample adjacent to the current sample.

In the method of encoding a video signal according to the present invention, when at least one sample of the current block uses an index mode, a palette index for at least one sample of the current block is derived by using the encoded palette index information and an encoded palette index run.

In the method of encoding a video signal according to the present invention, the palette index run indicates the number of times the same palette index is repeated.

In the method of encoding a video signal according to the present invention, in the step of restoring each sample of the current sample, when the value of the derived palette index relating to the current sample is equal to the number of palette entries in the palette map of the current block, the current sample is restored based on an escape mode (ESCAPE MODE).

In the method of encoding a video signal according to the present invention, the escape mode is a method of restoring a sample value based on a palette escape value which is additionally signaled, without using a palette entry of the configured palette map.

In the method of encoding a video signal according to the present invention, the escape mode is adaptively used based on the number of palette entries in the palette map of the current block.

In the method of encoding a video signal according to the present invention, when the number of palette entries in the palette map of the current block is greater than 0, it is allowed to restore at least one sample of the current block based on the escape mode. It is not allowed to restore the current block based on the escape mode when the number of palette entries in the palette map of the current block is equal to 0.

An apparatus for encoding a video signal according to the present invention comprises a restoring unit configured to construct a palette map for a current block encoded in a palette mode, derive a palette index according to a predetermined scanning order in units of a sample of the current block, and restore each sample of the current block by using a palette entry with a map index equal to the palette index derived from the palette map.

Advantageous Effects

According to the present invention, it is possible to improve the efficiency of prediction or restoration of a block to be encoded/decoded based on a palette mode.

According to the present invention, the pallet entry encoding/decoding efficiency can be improved by deriving the palette map of the block to be encoded/decoded from the palette map of the previous block.

According to the present invention, a palette index of a block to be encoded/decoded can be efficiently derived based on an index mode or a copy mode.

According to the present invention, the compression efficiency can be improved by encoding the palette index using the binary vector based on the run encoding.

According to the present invention, the sample values of the block to be encoded/decoded can be restored based on the escape mode, so that the samples out of the palette entry range can be efficiently encoded/decoded.

DESCRIPTION OF DRAWINGS

FIG. 6 illustrates a method for restrictively obtaining a reuse flag based on a last entry flag (last_previous_entry_flag), according to an embodiment of the present invention.

FIG. 10 illustrates a method of determining the number of palette entries used by a current block according to an embodiment of the present invention.

BEST MODE FOR CARRYING OUT THE INVENTION

Figure 1:
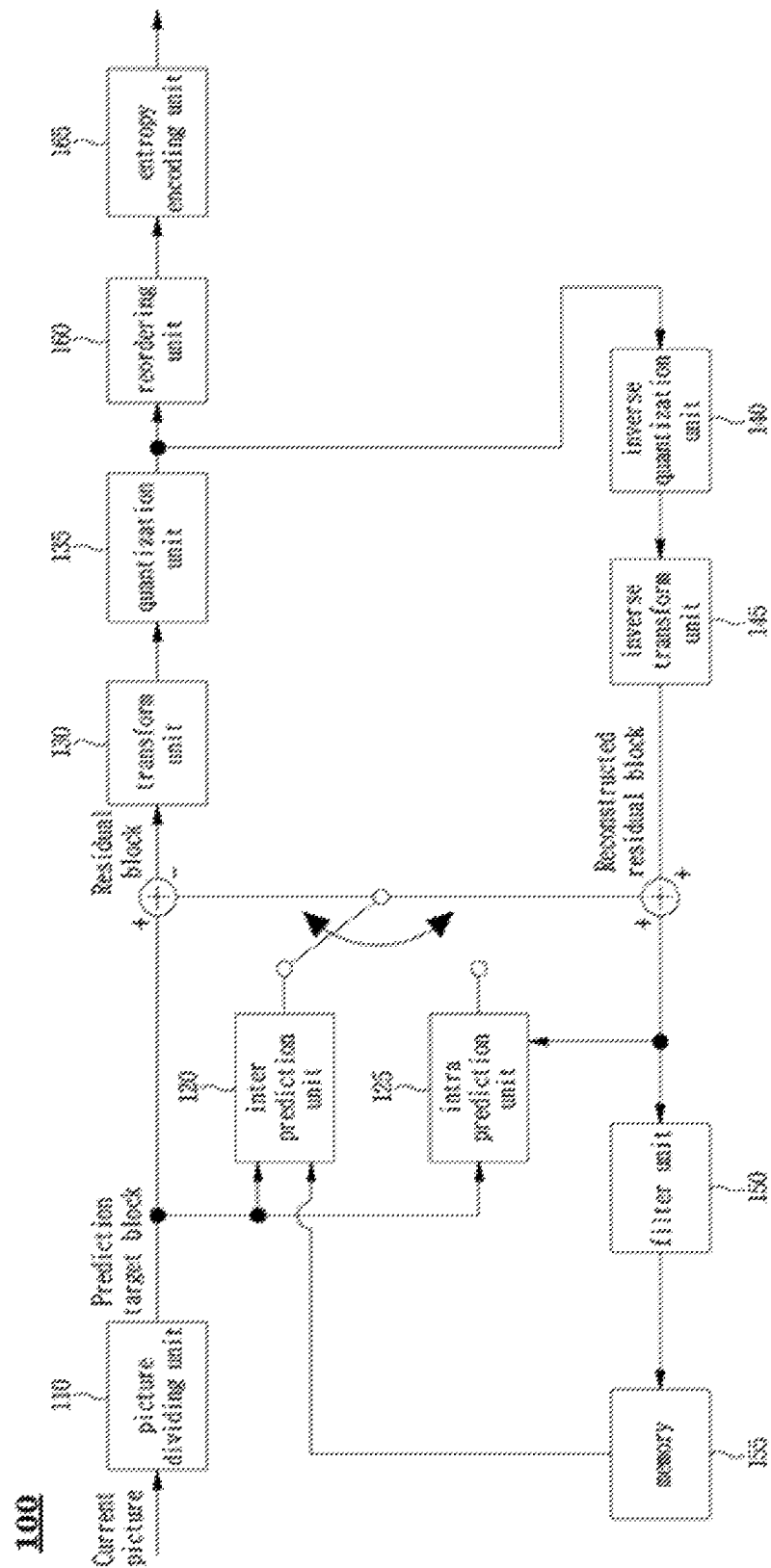
FIG. 1 is a block diagram illustrating a video encoding apparatus according to an embodiment of the present invention.

A method for decoding a video signal according to the present invention comprises constructing a palette map for a current block encoded in a palette mode, deriving a palette index according to a predetermined scanning order in units of a sample of the current block, and restoring each sample of the current block by using a palette entry with a map index equal to the palette index derived from the palette map.

In the method for decoding a video signal according to the present invention, the palette map may include at least one palette entry and a map index that identifies the palette entry.

In the method for decoding a video signal according to the present invention, the palette entry may include at least one of a predicted palette entry or a signaled palette entry.

In the method for decoding a video signal according to the present invention, the predicted palette entry may mean a palette entry reused in the current block among the palette entries included in the palette map of the previous block, and the signaled palette entry may mean a palette entry not included in the palette map of the previous block, among the palette entries used by the current block.

In the method for decoding a video signal according to the present invention, the predetermined scanning order may be either a horizontal traverse scan or a vertical traverse scan.

In the method for decoding a video signal according to the present invention, the horizontal traverse scan is a method in which an odd row of the current block is scanned from left to right, and an even row is scanned from right to left. The vertical traverse scan is a method in which an odd column of the current block is scanned from top to bottom and an even column is scanned from bottom to top.

In the method for decoding a video signal according to the present invention, the palette index is derived using at least one of an index mode (INDEX MODE) and a copy mode (COPY MODE).

In the method for decoding a video signal according to the present invention, the INDEX MODE is a method of deriving a palette index based on encoded palette index information, and the COPY MODE is a method of deriving a palette index of the current sample by using a palette index of a neighboring sample adjacent to the current sample.

In the method of decoding a video signal according to the present invention, when at least one sample of the current block uses an index mode, a palette index for at least one sample of the current block is derived by using the encoded palette index information and an encoded palette index run.

In the method of decoding a video signal according to the present invention, the palette index run indicates the number of times the same palette index is repeated.

In the method of decoding a video signal according to the present invention, in the step of restoring each sample of the current sample, when the value of the derived palette index relating to the current sample is equal to the number of palette entries in the palette map of the current block, the current sample is restored based on an escape mode (ESCAPE MODE).

In the method of decoding a video signal according to the present invention, the escape mode is a method of restoring a sample value based on a palette escape value which is additionally signaled, without using a palette entry of the configured palette map.

In the method of decoding a video signal according to the present invention, the escape mode is adaptively used based on the number of palette entries in the palette map of the current block.

In the method of decoding a video signal according to the present invention, when the number of palette entries in the palette map of the current block is greater than 0, it is allowed to restore at least one sample of the current block based on the escape mode. It is not allowed to restore the current block based on the escape mode when the number of palette entries in the palette map of the current block is equal to 0.

An apparatus for decoding a video signal according to the present invention comprises a restoring unit configured to construct a palette map for a current block encoded in a palette mode, derive a palette index according to a predetermined scanning order in units of a sample of the current block, and restore each sample of the current block by using a palette entry with a map index equal to the palette index derived from the palette map.

In the apparatus for decoding a video signal according to the present invention, the palette map may include at least one palette entry and a map index that identifies the palette entry.

In the apparatus for decoding a video signal according to the present invention, the palette entry may include at least one of a predicted palette entry or a signaled palette entry.

In the apparatus for decoding a video signal according to the present invention, the predicted palette entry may mean a palette entry reused in the current block among the palette entries included in the palette map of the previous block, and the signaled palette entry may mean a palette entry not included in the palette map of the previous block, among the palette entries used by the current block.

In the apparatus for decoding a video signal according to the present invention, the predetermined scanning order may be either a horizontal traverse scan or a vertical traverse scan.

In the apparatus for decoding a video signal according to the present invention, the horizontal traverse scan is a method in which an odd row of the current block is scanned from left to right, and an even row is scanned from right to left. The vertical traverse scan is a method in which an odd column of the current block is scanned from top to bottom and an even column is scanned from bottom to top.

In the apparatus for decoding a video signal according to the present invention, the restoring unit may derive the palette index using at least one of an index mode (INDEX MODE) and a copy mode (COPY MODE).

In the apparatus for decoding a video signal according to the present invention, the INDEX MODE is a method of deriving a palette index based on encoded palette index information, and the COPY MODE is a method of deriving a palette index of the current sample by using a palette index of a neighboring sample adjacent to the current sample.

In the apparatus of decoding a video signal according to the present invention, the restoring unit may derive a palette index for at least one sample of the current block by using the encoded palette index information and an encoded palette index run when at least one sample of the current block uses an index mode.

In the apparatus of decoding a video signal according to the present invention, the palette index run indicates the number of times the same palette index is repeated.

In the apparatus of decoding a video signal according to the present invention, the restoring unit may restore the current sample based on an escape mode (ESCAPE MODE) when the value of the derived palette index relating to the current sample is equal to the number of palette entries in the palette map of the current block.

In the apparatus of decoding a video signal according to the present invention, the escape mode is a method of restoring a sample value based on a palette escape value which is additionally signaled, without using a palette entry of the configured palette map.

In the apparatus of decoding a video signal according to the present invention, the escape mode is adaptively used based on the number of palette entries in the palette map of the current block.

In the apparatus of decoding a video signal according to the present invention, when the number of palette entries in the palette map of the current block is greater than 0, it is allowed to restore at least one sample of the current block based on the escape mode. It is not allowed to restore the current block based on the escape mode when the number of palette entries in the palette map of the current block is equal to 0.

A method for encoding a video signal according to the present invention comprises constructing a palette map for a current block encoded in a palette mode, deriving a palette index according to a predetermined scanning order in units of a sample of the current block, and restoring each of the current block by using a palette entry with a map index equal to the palette index derived from the palette map.

In the method for encoding a video signal according to the present invention, the palette map may include at least one palette entry and a map index that identifies the palette entry.

In the method for encoding a video signal according to the present invention, the palette entry may include at least one of a predicted palette entry or a signaled palette entry.

In the method for encoding a video signal according to the present invention, the predicted palette entry may mean a palette entry reused in the current block among the palette entries included in the palette map of the previous block, and the signaled palette entry may mean a palette entry not included in the palette map of the previous block, among the palette entries used by the current block.

In the method for encoding a video signal according to the present invention, the predetermined scanning order may be either a horizontal traverse scan or a vertical traverse scan.

In the method for encoding a video signal according to the present invention, the horizontal traverse scan is a method in which an odd row of the current block is scanned from left to right, and an even row is scanned from right to left. The vertical traverse scan is a method in which an odd column of the current block is scanned from top to bottom and an even column is scanned from bottom to top.

In the method for encoding a video signal according to the present invention, the palette index is derived using at least one of an index mode (INDEX MODE) and a copy mode (COPY MODE).

In the method for encoding a video signal according to the present invention, the INDEX MODE is a method of deriving a palette index based on encoded palette index information, and the COPY MODE is a method of deriving a palette index of the current sample by using a palette index of a neighboring sample adjacent to the current sample.

In the method of encoding a video signal according to the present invention, when at least one sample of the current block uses an index mode, a palette index for at least one sample of the current block is derived by using the encoded palette index information and an encoded palette index run.

In the method of encoding a video signal according to the present invention, the palette index run indicates the number of times the same palette index is repeated.

In the method of encoding a video signal according to the present invention, in the step of restoring each sample of the current sample, when the value of the derived palette index relating to the current sample is equal to the number of palette entries in the palette map of the current block, the current sample is restored based on an escape mode (ESCAPE MODE).

In the method of encoding a video signal according to the present invention, the escape mode is a method of restoring a sample value based on a palette escape value which is additionally signaled, without using a palette entry of the configured palette map.

In the method of encoding a video signal according to the present invention, the escape mode is adaptively used based on the number of palette entries in the palette map of the current block.

In the method of encoding a video signal according to the present invention, when the number of palette entries in the palette map of the current block is greater than 0, it is allowed to restore at least one sample of the current block based on the escape mode. It is not allowed to restore the current block based on the escape mode when the number of palette entries in the palette map of the current block is equal to 0.

An apparatus for encoding a video signal according to the present invention comprises a restoring unit configured to construct a palette map for a current block encoded in a palette mode, derive a palette index according to a predetermined scanning order in units of a sample of the current block, and restore each sample of the current block by using a palette entry with a map index equal to the palette index derived from the palette map.

Mode For Carrying Out The Invention

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating a video encoding apparatus according to an embodiment of the present invention.

Referring to FIG. 1, the video encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the video encoding apparatus, and does not mean that each element is composed of separate hardware or one software configuration unit. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide an input picture into at least one processing unit. Here, the processing unit may be a prediction unit (PU), a transform unit (TU) or a coding unit (CU). The picture dividing unit 110 may divide one picture into a plurality of combinations of CUs, PUs and TUs and encode the picture by selecting one combination of CUs, PUs and TUs on the basis of a predetermined criterion (for example, a cost function).

For example, one picture may be partitioned into a plurality of CUs. A recursive tree structure, such as a quad tree structure, may be used to partition a picture into CUs. A CU, for which a picture or a CU of a maximum size may be as root, may be partitioned into sub-coding units with as many child nodes as the partitioned CUs. A CU which is not partitioned any more in accordance with a predetermined limitation is a leaf node. That is, assuming that a CU may be partitioned into quadrants only, a single CU may be partitioned into at most four different CUs.

In the embodiments of the invention, a CU may be used to refer to not only a unit of encoding but also a unit of decoding.

A PU may be partitioned into at least one square or rectangular form with the same size in a CU. For PUs partitioned from a same CU, a PU may have different shape and/or size from another PU.

When a PU for intra prediction is generated based on a CU and the CU is not a minimum CU, the CU may be subjected to intra prediction without being partitioned into plural PUs (N×N).

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chroma pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, and advanced motion vector prediction (AMVP) mode, intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to obtain luma information or predicted luma signal information may be used to predict chroma information.

When a PU and a TU have the same size, intra prediction on the PU may be performed based on a left pixel, an upper-left pixel and an upper pixel of the PU. On the other hand, when a PU and a TU have different sizes, intra prediction may be performed by using reference pixels which are determined based on the TU. Intra prediction using N×N partitioning may be performed only for a minimum CU.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between the original block of the PU and the predicted block of a PU generated by the prediction units 120 and 125. The generated residual block may be input to the transform unit 130.

The transform unit 130 may transform the residual block using a transform method such as Discrete Cosine Transform (DCT), Discrete Sine Transform (DST) or KLT. The residual block includes information on the residual between the PU generated by the prediction units 120 and 125 and the original block. A transform method to be used to transform the residual block may be determined among DCT, DST and KLT on the basis of the information on the intra prediction mode of the PU which is used to generate the residual block.

The quantization unit 135 may quantize values transformed into a frequency domain by the transform unit 130. A quantization coefficient may be changed depending on a block or importance of an image. Values output from the quantization unit 135 may be provided to the dequantization unit 140 and the rearrangement unit 160.

The rearrangement unit 160 may rearrange quantized coefficients.

The rearrangement unit 160 may change a two-dimensional (2D) block of coefficients into a one-dimensional (1D) vector of coefficients through coefficient scanning. For example, the rearrangement unit 125 may change a 2D block of coefficients into a 1D vector of coefficients by scanning from DC coefficients to coefficients of a high frequency domain using zigzag scanning. Vertical scanning for scanning a 2D block of coefficients in a vertical and horizontal scanning for scanning a 2D block of coefficients in a horizontal direction may be used depending on a size of a TU and an intra prediction mode, instead of zigzag scanning. That is, a scanning method may be selected based on the size of the TU and the intra prediction mode, among zigzag scanning, vertical scanning, and horizontal scanning.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information on a CU, prediction mode information, partitioning unit information, PU information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The dequantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the dequantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
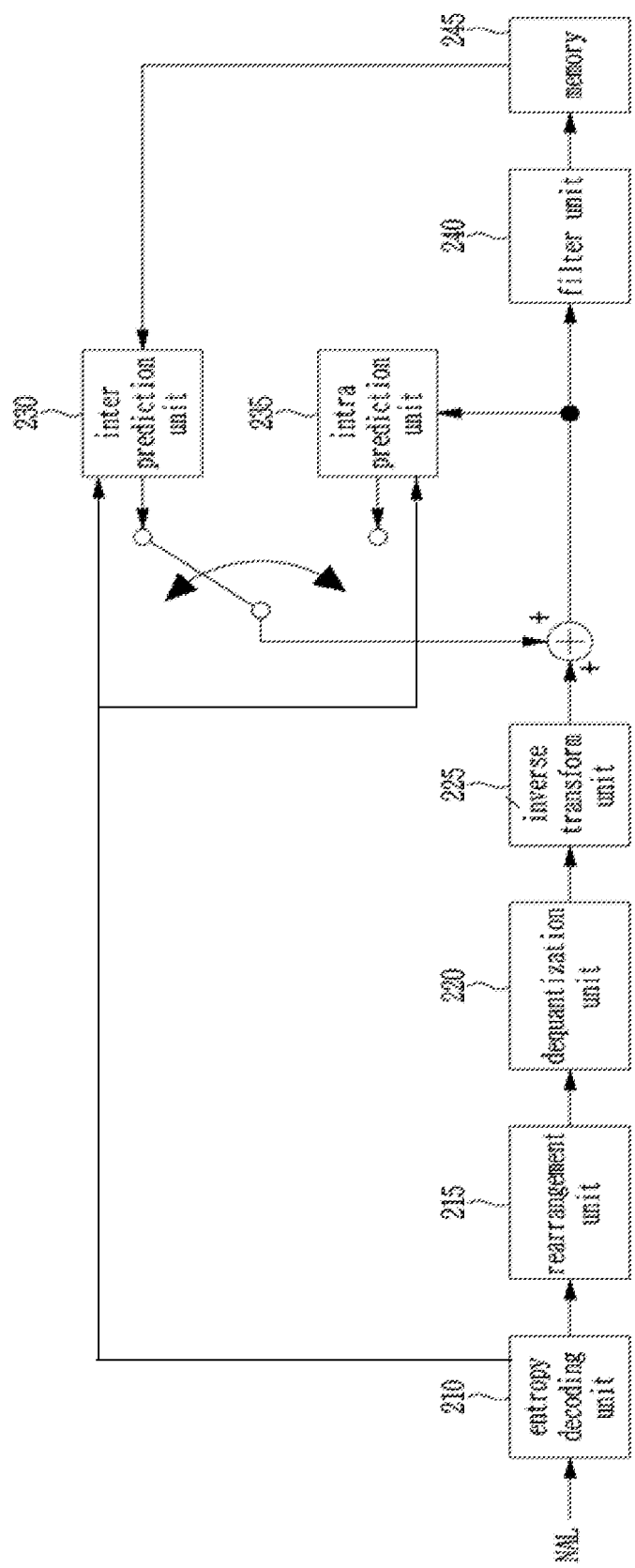
FIG. 2 is a block diagram illustrating an video decoding apparatus according to an embodiment of the present invention.

FIG. 2 is a block diagram illustrating a video decoding apparatus according an exemplary embodiment of the present invention.

Referring to FIG. 2, the video decoding apparatus 200 may include an entropy decoding unit 210, a rearrangement unit 215, a dequantization unit 220, an inverse transform unit 225, prediction units 230 and 235, a filter unit 240, and a memory 245.

When a video bitstream is input from the video encoding apparatus, the input bitstream may be decoded according to an inverse process of the video encoding process performed in the video encoding apparatus.

The entropy decoding unit 210 may perform entropy decoding according to an inverse process of the entropy encoding process by the entropy encoding unit of the video encoding apparatus. For example, various methods, such as exponential Golomb coding, CAVLC or CABAC, may be used for entropy encoding, corresponding to the method used by the video encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 on the basis of the rearrangement method of the encoding unit. The rearrangement unit 215 may reconstruct and rearrange coefficients of a 1D vector form into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided from the encoding apparatus and the rearranged coefficients of the block.

The inverse transform unit 225 may perform inverse transform performed by the transform unit (that is, inverse DCT, inverse DST or inverse KLT) on a result of quantization performed by the video encoding apparatus. Inverse transform may be performed on the basis of a transfer unit determined by the video encoding apparatus. The transform unit 225 of the video decoding apparatus may selectively perform the transform scheme (e.g., DCT, DST, KLT)

depending on a plurality of information elements, such as a prediction method, a size of the current block and a prediction direction, etc.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245

Similarly to the operation of the video encoding apparatus as described above, when a PU and a TU have the same size, intra prediction on the PU is performed based on left pixels, an upper-left pixel and upper pixels of the PU. On the other hand, when a PU and a TU have different sizes, intra prediction may be performed using reference pixels which are determined based on the TU. Intra prediction using N×N partitioning may be used only for a minimum CU.

The prediction units 230 and 235 may include a PU determination unit, an inter prediction unit and an intra prediction unit. The PU determination unit may receive a variety of information, such as PU information, prediction mode information on an intra prediction method and motion prediction-related information on an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one picture among a previous picture and a subsequent picture of a current picture including the current PU. An inter prediction unit 230 may use information necessary for inter prediction for the current PU provided from the video encoding apparatus. The inter prediction may be performed on the basis of the information of the pre-reconstructed partial region in the current picture including the current PU.

In order to perform inter prediction, it may be determined, in an unit of a CU, whether a motion prediction method for a PU included in the CU is a skip mode, a merge mode, an AMVP mode or intra block copy mode.

An intra prediction unit 235 may generate a prediction block on the basis of pixel information in a current picture. When a PU is a PU for which intra prediction is performed, intra prediction may be performed based on intra prediction mode information on the PU provided from the video encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the video encoding apparatus. When the prediction mode for the current block is a mode not performing MS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The video encoding apparatus may provide information on whether the deblocking filter is applied to a corresponding block or picture, and information on which of a strong filter and a weak filter is applied when the deblocking filter is used. The deblocking filter of the video decoding apparatus may be provided with information on the deblocking filter from the video encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in the embodiments of the invention, the term "coding unit" is used as an encoding unit for a convenience of descriptions. However, the term "coding unit" may be also used as a unit of decoding.

Figure 3:
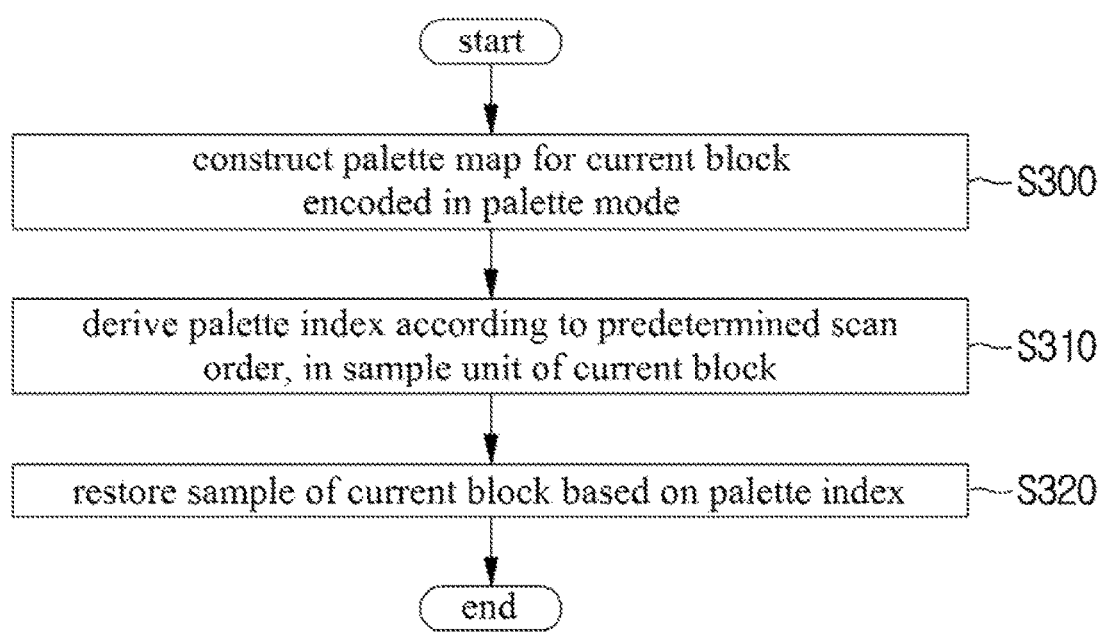
FIG. 3 illustrates a method of restoring a current block based on a palette mode according to an embodiment of the present invention.

FIG. 3 illustrates a method of restoring a current block based on a palette mode according to an embodiment of the present invention.

In the case of an image including an animation or a graphic, it may happen that all or a part of the image is composed of only a specific pixel value. In this case, a method of encoding a specific pixel value constituting the area may be used without using an inter prediction or intra prediction method, which is called a palette mode. The palette mode may be applied in a block unit (for example, a coding unit, a prediction unit). For this purpose, flag information (palette_mode_flag) indicating whether the palette mode is used may be signaled on a block basis.

Referring to FIG. 3, a palette map for a current block encoded in a palette mode may be constructed (S300).

The palette map may comprise at least one palette entry and a map index identifying each palette entry. The palette map of the current block can be derived from a palette map of the previous block (hereinafter referred to as a previous palette map). Here, the previous block may mean a block that has been encoded or decoded before the current block.

The palette entry of the current block may comprise at least one of a predicted palette entry or a signaled palette entry. The current block may use all or a part of the palette entries used by the previous block. A predicted palette entry may be representative of the palette entry reused in the current block among the palette entries used in the previous block.

Specifically, the current block may use the same palette map as the previous block. For this, a flag (palette_share_flag) indicating whether the current block uses the same palette map as the previous block may be signaled. Here, the same palette map means that the size of the palette map (or the number of palette entries included in the palette map) is the same and the palette entries included in the palette map are the same. When the value of palette_share_flag is 1, the current block uses the same palette map as the previous block. When the value of the palette_share_flag is 0, the current block may use the palette map in which at least one of the size of the palette map or the palette entries included in the palette map is different from that of the neighboring block.

Alternatively, the current block may selectively use some palette entries of the previous palette map. For this purpose, a flag (previous_palette_entry_flag, hereinafter referred to as a reuse flag) for specifying whether the palette entry is reused may be used. Specifically, the value of the reuse flag is assigned to each of the palette entries of the previous palette map. The reuse flag (previous_palette_entry_flag [i]) indicates that the palette entry corresponding to the map index i in the previous palette map is reused or not. For example, if the value of the reuse flag is 1, the palette entry corresponding to the map index i in the previous palette map is reused in the palette map of the current block. Otherwise, it is not reused. A palette map of the current block may be constructed by extracting palette entries having a reuse flag equal to 1 from the previous pallet map and sequentially arranging the palette entries. The reuse flag may be signaled in the form of a flag encoded for each palette entry, or may be signaled in the form of a binary vector based on a run encoding, which will be described in detail with reference to FIG. 4 to FIG. 6.

In order to selectively use some of the palette entries in the palette map of the previous block, a re-use variable array (predictor_palette_entry_reuse_flag) for specifying whether the previous palette entry is reused and a syntax palette_predictor_run value for specifying the number of reuse variables equal to 0 between non-zero reuse variables in the reuse variable array may be used.

In addition, the palette map of the current block may further include a signaled palette entry signaled from the bitstream. Here, the signaled palette entry includes a palette entry that is not included in the previous palette map, among the palette entries used by the current block.

Referring to FIG. 3, a palette index may be derived according to a predetermined scan order in a sample unit (or pixel unit) of the current block (S310).

As the scan order of the present invention, a horizontal scan, a vertical scan, a horizontal traverse scan, a vertical traverse scan, or the like may be used, and this will be described in detail with reference to FIG. 9.

A palette index for the current block may be derived using at least one of an index mode (INDEX MODE) or a copy mode (COPY MODE).

Here, the index mode (INDEX MODE) may refer to a method of deriving a palette index based on encoded palette index information to specify a palette index used in the current block. The palette index information has a value between 0 and (palette size−1), wherein the palette size may indicate the size of the palette map of the current block or the number of palette entries constituting the palette map. In the index mode, the value of the signaled palette index information through the bit stream may be assigned to the palette index of the current sample. A method of deriving a palette index based on the index mode will be described in detail with reference to FIGS. 7 and 8.

The copy mode (COPY MODE) may refer to a method of deriving the palette index of the current sample using the palette index of the neighboring sample. For example, in the copy mode, the palette index of the current sample may be predicted based on the palette index of the neighboring sample, or the palette index of the neighboring sample may be copied and set as the palette index of the current sample. Here, a neighboring sample may mean a sample adjacent to the top, bottom, left, or right side of the current sample. In particular, the neighboring sample may be located on the same horizontal line or the same vertical line as the current sample.

The copy mode may include at least one of a copy above mode (COPY_ABOVE MODE) in which a palette entry used by a sample adjacent to the upper end of the current sample is used as a palette entry of the current sample or a copy left mode (COPY_LEFT MODE) in which a palette entry used by a sample adjacent to the left side of the current sample is used as a palette entry of the current sample. One of the copy above mode or the copy left mode may be selectively used according to the scan order of the current block. For example, if the current block uses a horizontal scan or a horizontal traverse scan, a copy above mode may be used. If the current block uses a vertical scan or vertical traverse scan, a copy left mode may be used. In addition, the scan start position of the current block is not limited to the upper left sample, and other corner samples (for example, lower-left sample, upper-right sample, and lower-right sample) of the current block may be used as the scan start position. Therefore, according to the scan order and the scan start position of the current block, the same palette entry as the sample adjacent to the upper or left side may be used, or the same palette entry as the sample adjacent to the lower or right side may be used. In this case, the copy mode may further include a copy right mode (COPY_RIGHT MODE) and/or a copy under mode (COPY_UNDER MODE).

Alternatively, regardless of the scan order, one of the copy above mode or the copy left mode may be selectively used. For this purpose, a flag (use_copy_above_flag) specifying the scan mode may be signaled. The use_copy_above_flag may be signaled on a slice header, slice segment header, or block basis. If the value of use_copy_above_flag is 1, the copy above mode may be used in the corresponding slice or block, and if the value of use_copy_above_flag is 0, the copy left mode may be used in that slice or block.

A mode identifier (palette_index_mode) for specifying a method of deriving a palette index for each sample of a current block may be used to selectively use any one of the palette index modes such as the index mode and the copy mode described above. Hereinafter a method of deriving a palette index for each sample of a current block is referred to as a palette index mode. For example, if the value of the mode identifier is 1, the current sample of the current block uses the copy mode, and if the value of the mode identifier is 0, the current sample may use the index mode.

The mode identifier may be signaled based on a flag (use_one_palette_mode_flag) indicating whether the current block uses only one pallet index mode. The use_one_palette_mode_flag may be signaled in units of blocks (for example, coding unit, prediction unit).

For example, when the current block uses only one palette index mode according to the value of use_one_palette_mode_flag, the mode identifier is not signaled through the bitstream, and the palette index mode pre-defined at the video decoding apparatus may be used as the index mode of the current block. To this end, the value of the mode identifier for each sample of the current block may be set to 1 or 0.

On the other hand, according to the value of use_one_palette_mode_flag, the current block is not limited to using only one palette index mode, and the mode identifier may be signaled through a bit stream when a plurality of palette index modes are used.

Alternatively, the mode identifier may be signaled based on a flag (palette_above_present_flag) indicating whether at least one sample in the current block uses the copy mode.

For example, if at least one of the samples in the current block uses the copy mode according to the value of palette_above_present_flag, the mode identifier may be signaled through the bitstream. On the other hand, when the samples of the current block do not use the copy mode according to the value of palette_above_present_flag, the mode identifier is not signaled through the bitstream, and the palette index mode pre-defined at the video decoding apparatus is used as the palette index mode of the current block. To this end, the value of the mode identifier for each sample of the current block may be set to zero.

Referring to FIG. 3, a sample of a current block may be restored based on the palette index derived in step S310 (S320).

Specifically, the sample of the current block may be restored based on the palette map of the current block configured in step S300 and the palette index derived in step S310. A palette entry having a map index of the same value as the derived palette index is extracted from the palette map of the current block, and then the sample of the current block may be restored using the palette entry. For example, the value of the palette entry extracted from the palette map may be set to the predicted value or the restored value of the sample of the current block.

However, the value of the derived palette index may be equal to the number of palette entries constituting the palette map of the current block. In this case, the sample of the current block can be restored by using the palette entry of the palette map configured in step S300. That is, since the map index of the palette map has a value between 0 (the number of palette entries−1), the value of the derived palette index equal to the number of palette entries means that there is no palette entry corresponding to the derived palette index in the palette map configured in step S300. In this way, when a sample having a palette index of the same value as the number of palette entries in the current block exists, the sample may be determined to be encoded in an escape mode (ESCAPE MODE). Here, the escape mode may refer to a method of restoring a sample value based on a palette escape value that is additionally signaled, instead of using the palette entry of the palette map constructed in step S300. Thus, a sample having a palette index equal to the number of palette entries may be restored using the additionally signaled palette escape value.

On the other hand, the escape mode may be adaptively used based on the number of palette entries constituting the palette map of the current block. A method for determining the number of palette entries used by the current block will be described later with reference to FIG. 10. For example, if the number of palette entries used by the current block is greater than zero (e.g., if the number of palette entries is one), restoring at least one sample of the current block based on the escape mode may be allowed. Conversely, if the number of palette entries used by the current block is zero, the current block is not allowed to be restored based on the escape mode.

Figure 4:
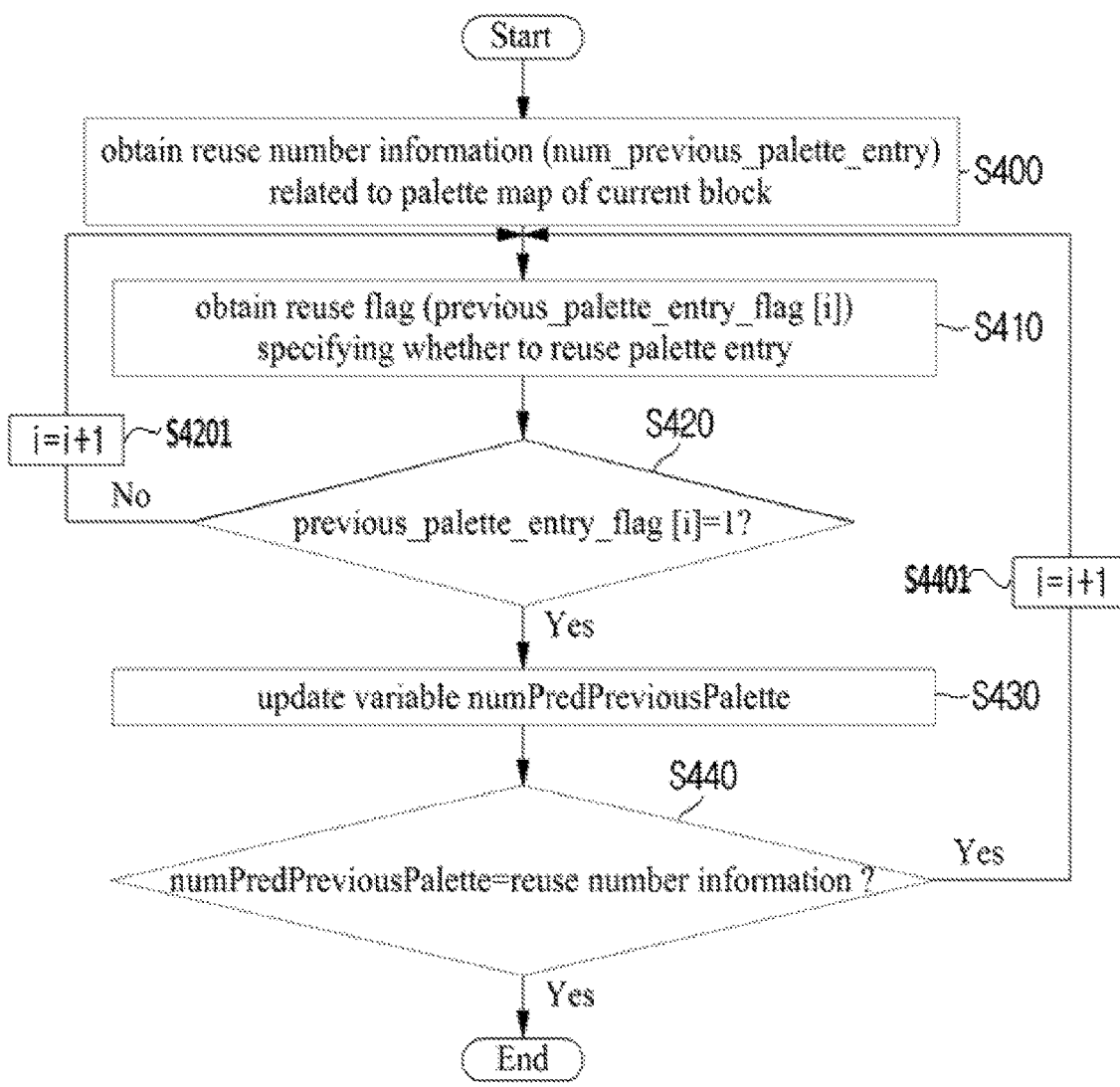
FIG. 4 illustrates a method of restrictively signaling of a reuse flag (previous_palette_entry_flag) according to an embodiment of the present invention.

FIG. 4 illustrates a method of signaling of a reuse flag (previous_palette_entry_flag) according to an embodiment of the present invention.

Referring to FIG. 4, the reuse number information (num_previous_palette_entry) related to the palette map of the current block may be obtained from the bitstream (S400).

Here, the reuse number information may mean information encoded to indicate the number of palette entries reused as palette entries of the current block among the palette entries of the previous palette map.

A reuse flag (previous_palette_entry_flag [i]) specifying whether or not the i-th palette entry is to be reused may be obtained from the bitstream (S410).

The reuse flag is signaled by the size of the previous palette map (or the number of palette entries included in the previous palette map). Here, i corresponds to a map index that identifies the palette entry of the previous palette map, and the value of i is in a range 0 to (size of the previous palette map−1).

It may be checked whether the value of the reuse flag obtained in step S410 is 1 (S420).

As a result of checking, if the value of the reuse flag is 1 (Yes-S420), a variable numPredPreviousPalette indicating the number of reuse flags equal to 1 may be updated (S430). For example, the value of the variable numPredPreviousPalette may be increased by one.

On the other hand, if the value of the reuse flag is 0, a reuse flag (previous_palette_entry_flag [i+1]) specifying whether to reuse the (i+1)-th palette entry may be obtained from the bitstream (S410) after a value 'i' is incremented by 'i=i+1' (S4201).

It is possible to compare whether the variable numPredPreviousPalette value increased in step S430 and the reuse number information obtained in step S400 are the same (S440).

If the variable numPredPreviousPalette is not equal to the number information obtained in step S400, a reuse flag (previous_palette_entry_flag [i+1]) specifying whether to reuse the (i+1)-th palette entry may be obtained from the bitstream (S410) after a value 'i' is incremented by 'i=i+1' (S4401). However, if the variable numPredPreviousPalette is equal to the number information obtained in step S400, a palette entry having a map index greater than the i value may not be used as a palette entry of the current block. For this, if the variable numPredPreviousPalette is equal to the number information obtained in step S400, the value of i may be derived to be equal to or larger than the size of the previous palette map. For example, the value of i may be derived by adding 1 to the size of the previous palette map. Thus, by setting the value of i to be equal to or greater than the size of the previous palette map, the reuse flag associated with the (i+1)-th palette entry may not be signaled.

Figure 5:
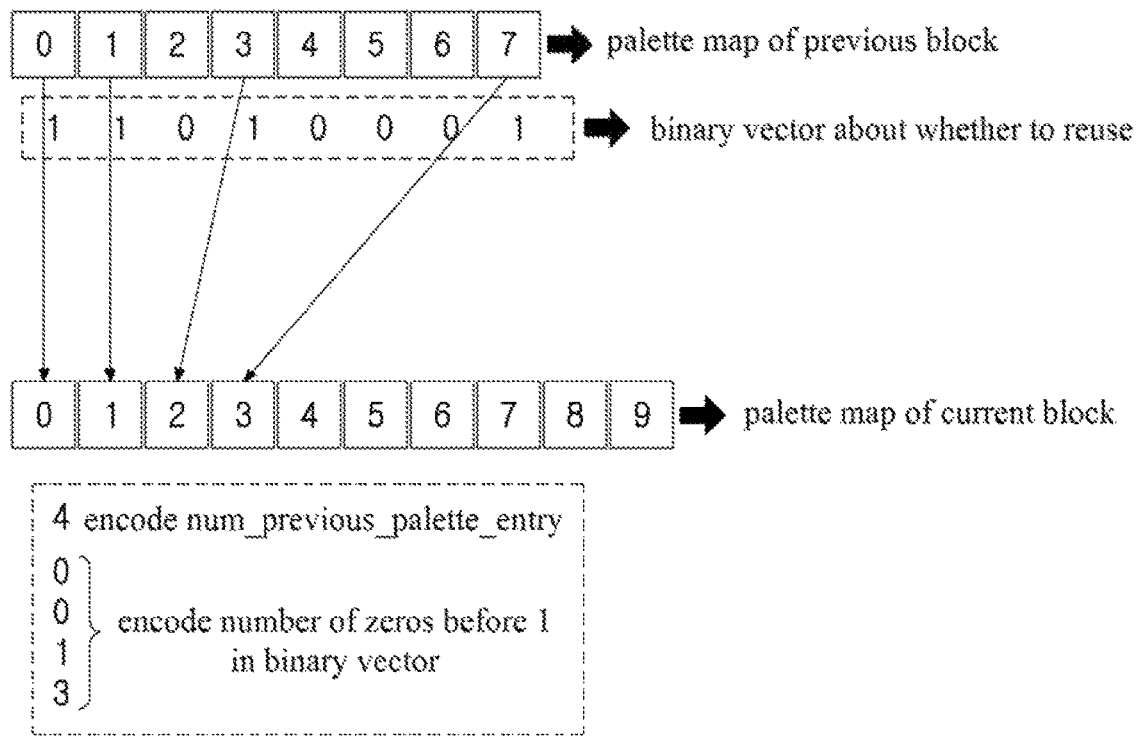
FIG. 5 illustrates a method of signaling a reuse flag in the form of a binary vector based on a run encoding, according to an embodiment of the present invention.

FIG. 5 illustrates a method of signaling a reuse flag in the form of a binary vector based on a run encoding, according to an embodiment of the present invention.

In the present embodiment, it is assumed that the palette map of the previous block uses eight palette entries having a map index of 0 to 7.

For each of the palette entries of the previous block with index 0 to 7, the video encoding apparatus determines whether the palette entry is reused as a palette entry of the current block. If the palette entry is reused as a palette entry of the current block, the value of the reuse flag for the palette entry may be set to be 1, and otherwise, it may be set to be 0. For example, as shown in FIG. 5, when the palette entries of 0, 1, 3, and 7 among the palette entries of the previous block are reused as palette entries of the current block and the remaining palette entries are not reused, a binary vector represented by 11010001 may be generated.

Then, at least one of the number of 1's in the binary vector (i.e., the number of palette entries reused as a palette entry of the current block in the previous block) or the number of zeros earlier than 1 in the binary vector is encoded, and then it may be signaled to the video decoding apparatus. For example, since the number of 1's in the binary vector is 4, 4 may be encoded as the number of palette entries of the previous block reused as the palette entry of the current block. In addition, the number of zeros preceding the 1 in the binary vector, that is, 0, 0, 1, and 3, may be sequentially encoded.

The video decoding apparatus may receive, from the video encoding apparatus, at least one of information (num_previous_palette_entry) about the number of palette entries of a previous block reused as palette entries of the current block or information (palette_entry_run) about the number of zeros preceding the 1 in the binary vector, and then construct a palette map of the current block by using it.

For example, the video decoding apparatus successively extracts information (palette_entry_run) about the number of zeros preceding the 1 in the binary vector, that is, 0, 0, 1, and 3, from the bitstream. The binary vector indicating whether to reuse the palette entry of a previous block, that is, 11010001 may be restored by using the extracted information. When a value of 1 is generated in the process of restoring the binary vector, the palette entry of the previous block corresponding to the value 1 may be inserted into the palette map of the current block. Through this process, a palette map of the current block may be constructed by selectively reusing some palette entries from the palette map of the previous block.

FIG. 6 illustrates a method of obtaining a reuse flag in a limited manner based on a last entry flag (last_previous_entry_flag) according to an embodiment of the present invention.

Referring to FIG. 6, a reuse flag (previous_palette_entry_flag [idx]) may be obtained in consideration of the size of the palette map of the previous block (S600).

The reuse flag may indicate whether the palette entry corresponding to the current map index idx in the palette map of the previous block is reused as the palette entry of the current block. The reuse flag may be obtained within a range where the current map index idx is smaller than the size of the palette map of the previous block (or the number of palette entries constituting the palette map of the previous block).

The last entry flag (last_previous_entry_flag) may be obtained based on the reuse flag obtained in step S600 (S610).

Specifically, if the value of the reuse flag is 1, the last entry flag is extracted from the bitstream, and if the value of the reuse flag is 0, the last entry flag is not extracted from the bitstream.

Here, the last entry flag may indicate whether the palette entry corresponding to the current map index idx is the last palette entry of the palette entries of the previous block that are reused as the palette entry of the current block. For example, if the value of the last entry flag is 1, a palette entry having a map index value greater than the current map index idx is not reused as a palette entry of the current block. On the other hand, if the value of the last entry flag is 0, at least one of the palette entries having the map index value greater than the current map index idx may be reused as the palette entry of the current block.

The value of the current map index idx may be updated to be a predetermined value based on the last entry flag obtained in step S610 (S620).

For example, if the value of the last entry flag is 1, the value of the current map index idx may be updated to be the same value as the size of the palette map of the previous block. In this case, as described above, as the reuse flag is extracted within the size range of the palette map of the previous block, the reuse flag is not signaled for the palette entry having the map index value greater than the current map index idx.

On the other hand, when the value of the last entry flag is 0, it means that at least one of palette entries having a map index greater than the current map index idx may be reused as a palette entry of the current block. Thus, the current map index idx may be increased by one. That is, the current map index idx value is updated to (idx+1), and steps S600 and S610 may be repeated until the value of the last entry flag reaches 1.

Through the above-described process, the reuse flag of the present invention may be limitedly signaled based on the value of the last entry flag.

Figure 7:
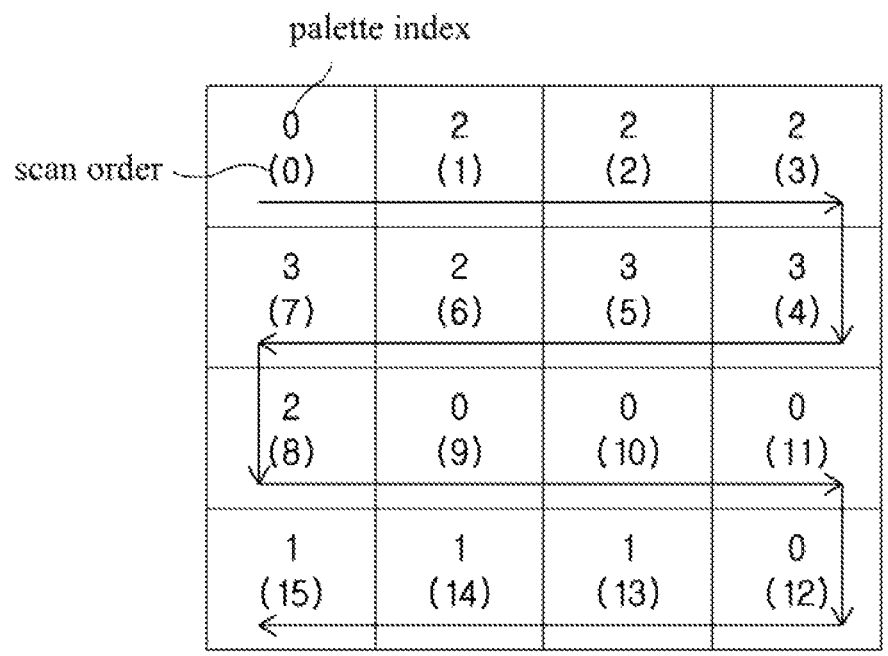
FIG. 7 illustrates a method of deriving a palette index of a current block based on palette index information and a palette index run according to an embodiment of the present invention.

FIG. 7 illustrates a method of deriving a palette index of a current block based on palette index information and a palette index run according to an embodiment of the present invention.

First, the process of encoding the palette index information and the palette index run in the video encoding apparatus will be described. For convenience of explanation, it is assumed that that the current block is encoded in the index mode, as shown in FIG. 7, each sample uses a palette index in the range of 0 to 3, and a horizontal traverse scan in which the upper-left sample of the current block is the start position is used.

Referring to FIG. 7, if the palette index used by the current block is arranged in a one-dimensional form according to the horizontal traverse scan order, it may be expressed as the following {0, 2, 2, 2, 3, 3, 3, 3, 2, 0, 0, 0, 0, 1, 1, 1}. The one-dimensional array may be grouped into successive and equal-valued palette indices. That is, the one-dimensional array may be composed of a first group consisting of one 0 value, a second group consisting of three 2 values, a third group consisting of four 3 values, a fourth group consisting of one 2 value, a fifth group consisting of four 0 values, and a sixth group consisting of three 1 values. The redundancy of the palette indexes for each group is removed. As shown in Table 1 below, palette index information and/or information about the number of palette indices to be encoded may be generated by specifying and encoding palette indices to be encoded and/or the number of palette indices to be encoded.

TABLE 1

| Group | | Palette index to be encoded | Palette index information | Palette index run |
|---|---|---|---|---|
| 1 | {0} | 0 | 0 | 0 |
| 2 | {2, 2, 2} | 2 | 2 | 2 |
| 3 | {3, 3, 3, 3} | 3 | 3 | 3 |
| 4 | {2} | 2 | 2 | 0 |
| 5 | {0, 0, 0, 0} | 0 | 0 | 3 |
| 6 | {1, 1, 1} | 1 | 1 | 2 |

That is, {0, 2, 3, 2, 0, 1} may be obtained by eliminating the redundancy of the palette index for each group. In this case, the palette index to be encoded is specified as {0, 2, 3, 2, 0, 1}, and the number of palette indices to be encoded may be specified to be six.

In addition, the video encoding apparatus may encode the number of times the same palette index is repeated for each group (hereinafter referred to as a palette index run). For example, as shown in Table 1, since the first group is composed of one 0 value, the palette index run is determined to be 0. In the second group, since the palette index 2 is used at the sample having the scan order (1) and the same palette indices 2 are successively used at the samples having scan orders (2) and (3), the palette index run may be determined to be 2. The video encoding apparatus may encode the determined value of the palette index run as it is or may divide it into the most significant bit (MSB) and the refinement bit for encoding efficiency.

Through the above-described process, the video encoding apparatus may encode at least one of the information about the number of palette indices to be encoded, the palette index information about the palette indices to be encoded, or the palette index run.

The video decoding apparatus may obtain the palette index information and the palette index run from the bit stream and derive the palette index for each sample of the current block using the palette index information and the palette index run.

The palette index information may be obtained as many as the number corresponding to information on the number of palette indices to be encoded. A palette index run corresponding to each palette index information may be sequentially obtained to derive a palette index of the current block. For example, the video decoding apparatus may obtain palette index information of {0, 2, 3, 2, 0, 1} from the bit stream. Then, a palette index run corresponding to palette index information 0 may be obtained from the bitstream. If the value of the palette index run corresponding to the palette index information 0 is 0, the video decoding apparatus may assign the palette index 0 to the sample having the scan order (0) of the current block. Then, a palette index run corresponding to palette index information 2 may be obtained from the bitstream. If the value of the palette index run corresponding to the palette index information 2 is 2, the video decoding apparatus may sequentially assign the palette index 2 to the samples having the scan order (1) to (3) of the current block according to the scan order. In this way, a palette index may be derived for all samples in the current block.

Figure 8:
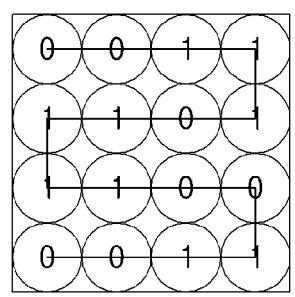
FIG. 8 illustrates a method of deriving a palette index of a current block based on palette index information and a palette index run when the palette map of the current block is composed of two palette entries.

FIG. 8 illustrates a method of deriving a palette index of a current block based on palette index information and a palette index run when the palette map of the current block is composed of two palette entries.

First, the process of encoding the palette index information and the palette index run in the video encoding apparatus according to the present invention will be described. For convenience of explanation, it is assumed that the current block is encoded in the index mode, two palette indices are used as shown in FIG. 8, and a horizontal traverse scan in which the upper-left sample of the current block is the start position is used.

Referring to FIG. 8, if the palette indices used by the current block are arranged in a one-dimensional form according to the horizontal traverse scan order, it may be expressed the following {0, 0, 1, 1, 1, 0, 0, 1, 1, 1, 1, 0, 0, 1, 1, 0, 0}. If the one-dimensional array is grouped into the palette indices of successive and the same values according to the method described in FIG. 7 and the redundancy of the palette indices is removed for each group, the palette indices to be encoded and/or the number of palette indices to be encoded may be specified.

TABLE 2

| Group | Palette index to be encoded | Palette index information | Palette index run |
|---|---|---|---|
| 1 | {0, 0} | 0 | 0 | 1 |
| 2 | {1, 1, 1} | 1 | — | 2 |
| 3 | {0} | 0 | — | 0 |
| 4 | {1, 1, 1, 1} | 1 | — | 3 |
| 5 | {0, 0} | 0 | — | 1 |

TABLE 2-continued

| Group | Palette index to be encoded | Palette index information | Palette index run |
|---|---|---|---|
| 6 | {1, 1} | 1 | — | 1 |
| 7 | {0, 0} | 0 | — | 1 |

In other words, {0, 1, 0, 1, 0, 1, 0} may be obtained by eliminating the redundancy of the palette index for each group. In this case, the palette index to be encoded may be specified as {0, 1, 0, 1, 0, 1, 0}, and the number of palette indices to be encoded may be specified to be 7.

However, when the palette map of the current block is composed of two palette entries, it is not necessary to encode all the palette indices to be encoded since two palette indices alternately occur. If only the palette index of the first sample of the current block (e.g., the sample with the first scan order) is signaled, the palette index of samples with subsequent scan order will be derived in the video decoding apparatus based on the encoded palette index run.

Therefore, in the video encoding apparatus, it is possible to encode palette index information about the first sample among the palette indices to be encoded and all palette index runs corresponding to the palette index to be encoded.

The video decoding apparatus may obtain the palette index information and the palette index run from the bit stream and derive the palette index for each sample of the current block by using the palette index information and the palette index run. Here, as described above, the palette index information is palette index information about a sample having the first scan order in the current block.

Referring to FIG. 8, when the video decoding apparatus obtains palette index information 0 from a bitstream and obtains a palette index run 1 corresponding to the palette index information, the palette index 0 may be sequentially allocated to samples having the scan order (1) and (2) in the current block. Then, if palette index runs 2 of a second group is obtained from the bitstream, palette indices of a second group may be derived to be a different value from the palette index used right before. That is, since the value of the palette index used right before is 0, the palette index of the second group may be derived to be 1. In this case, the video decoding apparatus may sequentially allocate the palette index 1 to samples having the scanning order (2) to (4) of the current block, in accordance with the scanning order. In this way, a palette index may be derived for all samples in the current block.

Figure 9:
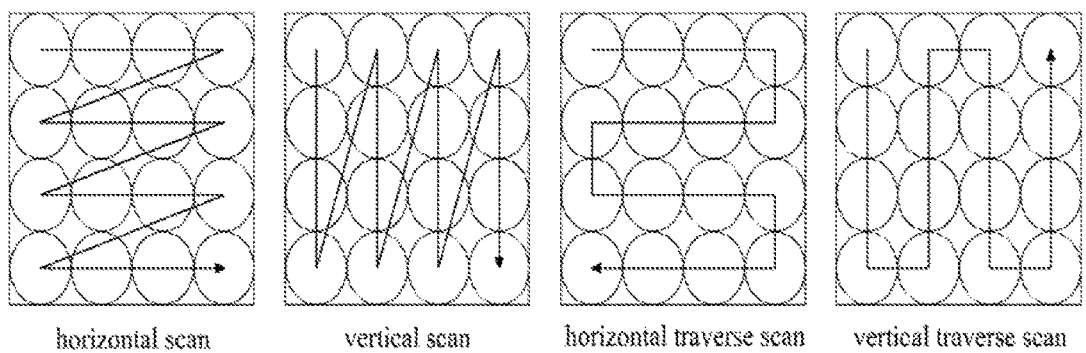
FIG. 9 illustrates a scan order in the palette mode according to an embodiment of the present invention.

FIG. 9 illustrates a scan order used in the palette mode according to an embodiment of the present invention.

Referring to FIG. 9, the scan order used in the palette mode includes a horizontal scan, a vertical scan, a horizontal traverse scan, and a vertical traverse scan.

Specifically, the horizontal scan is a method of scanning each row of the current block from left to right, and the vertical scan is a method of scanning each column of the current block from top to bottom.

The horizontal traverse scan is a method of scanning the odd rows of the current block from left to right and the even rows from right to left. A vertical traverse scan is a method in which odd columns of the current block is scanned from top to bottom while an even columns are scanned from bottom to top.

However, in this embodiment, it is assumed that the upper-left sample of the current block is set to be the scan start position, but the present invention is not limited to this, and another corner sample of the current block may be set to be the scan start position.

FIG. 10 illustrates a method of determining the number of palette entries used by a current block according to an embodiment of the present invention.

Referring to FIG. 10, a flag (one_palette_entry_flag) indicating whether the number of palette entries used by the current block is 1 may be obtained from the bitstream (S1000).

Specifically, if the value of one_palette_entry_flag is 1, the current block is restored using only one palette entry, and if the value of one_palette_entry_flag is 0, the current block may be restored using a plurality of palette entries. Thus, if the value of one_palette_entry_flag is 1, the number of palette entries in the current block may be determined to be 1, and if the value of one_palette_entry_flag is 0, the number of palette entries in the current block is derived based on the number of signaled palette entries from the bitstream.

Referring to FIG. 10, when the value of one_palette_entry_flag is 0, the number information (palette_num_signalled_entries) of the signaled palette entry may be obtained from the bitstream (S1010).

The number information of the signaled palette entries may indicate the number of palette entries not included in the previous palette map among the palette entries used by the current block.

It is possible to derive the number of palette entries of the current block based on at least one of the palette_num_signalled_entries obtained in step S1010 and the number of palette entries (numPredPreviousPalette) to be reused as palette entries of the current block in the previous palette map.

Specifically, if the value of numPredPreviousPalette is not 0, the number of palette entries of the current block (or the palette size) may be derived based on the sum of the value of numPredPreviousPalette and the value of palette_num_signalled_entries (S1020).

On the other hand, when the value of numPredPreviousPalette is 0, it means that the palette entry of the previous block is not reused. The number of palette entries of the current block may be derived based on palette_num_signalled_entries. For example, the number of palette entries of the current block (or the palette size) may be derived by adding 2 to palette_num_signalled_entries (S1030). This is because if the value of one_palette_entry_flag is 0, the palette map of the current block will contain at least two palette entries, so palette_num_signalled_entries is encoded with the number of actual palette entries used by the current block minus two. However, the present invention is not limited to this, and palette_num_signalled_entries may be directly encoded as the number of actual palette entries used by the current block. In this case, the number of palette entries of the current block may be derived to have the same value as palette_num_signalled_entries.

INDUSTRIAL AVAILABILITY

The present invention can be used to code a video signal.

The invention claimed is:

1. A method of decoding a video signal, the method comprising:
   constructing a palette map for a current block encoded in a palette mode, the palette map comprises at least one palette entry and a map index that for identifying the palette entry;
   deriving a palette index according to a predetermined scan order of the current block on a sample-by-sample basis; and
   reconstructing each sample of the current block by using a palette entry having a map index of the same value as the derived palette index from the palette map,
   wherein the palette entry comprises at least one of a predicted palette entry and a signaled palette entry, the predicted palette entry means a palette entry reused in the current block among palette entries included in a palette map of a previous block, and the signaled palette entry indicates a palette entry not included in the palette map of the previous block among the palette entries used by the current block,
   wherein the predicted palette entry is derived from information about palette entry run, the information about palette entry run is used to determine a number of zeros that precede a non-zero entry in palette entries in the previous block,
   wherein when a number of the predicted palette entry is smaller than a maximum number of palette entry, the signaled palette entry is derived,
   wherein the palette index is derived using at least one of an index mode or a copy mode, the index mode is a method of deriving a palette index based on information about palette index run, and the copy mode is a method of deriving a palette index of the current sample using a palette index of a neighboring sample,
   wherein when at least one sample of the current block uses the index mode, the palette index is derived using the information about palette index run indicating the number of consecutive sample locations with same palette index, and
   wherein a value of the palette index run was entropy encoded selected from one of two encoded types based on a number of bits used,
     as a first encoded type, a value of the palette index run is derived from a single encoded element that represents the value of the palette index run as is,
     as a second encoded type, a value of the palette index run is derived from two encoded elements that represent a most significant bit (MSB) value as is and refinement bits as is of the value of the palette index run.

2. The method of claim 1, wherein the predetermined scan order is one of a horizontal traverse scan and a vertical traverse scan, and
   wherein the horizontal traverse scan is a method in which an odd row of the current block is scanned from left to right and an even row is scanned from right to left and the vertical traverse scan is a method in which an odd column of the current block is scanned from top to bottom and an even column is scanned from bottom to top.

3. The method of claim 1, wherein in restoring each sample of the current sample,
   if the value of the derived palette index for the current sample is equal to the number of palette entries constituting the palette map of the current block, the current sample is restored based on an escape mode (ESCAPE MODE)
   wherein the escape mode is a method of restoring a sample value based on a palette escape value that is additionally signaled without using a palette entry of the configured palette map.

4. The method of claim 3, wherein the escape mode is selectively used based on the number of palette entries constituting the palette map of the current block.

5. The method of claim 4, wherein when the number of palette entries constituting the palette map of the current block is greater than 0, it is allowed to restore at least one sample of the current block based on the escape mode, and wherein when the number of palette entries constituting the palette map of the current block is 0, it is not allowed to restore the current block based on the escape mode.

6. A method of encoding a video signal, the method comprising:

constructing a palette map for a current block encoded in a palette mode, the palette map comprises at least one palette entry and a map index that for identifying the palette entry;

deriving a palette index according to a predetermined scan order of the current block on a sample-by-sample basis; and reconstructing each sample of the current block by using a palette entry having a map index of the same value as the derived palette index from the palette map, wherein the palette entry comprises at least one of a predicted palette entry and a signaled palette entry, the predicted palette entry means a palette entry reused in the current block among palette entries included in a palette map of a previous block, and the signaled palette entry indicates a palette entry not included in the palette map of the previous block among the palette entries used by the current block, wherein the predicted palette entry is derived from information about palette entry run, the information about palette entry run is signaled to determine a number of zeros that precede a non-zero entry in palette entries in the previous block, wherein when a number of the predicted palette entry is smaller than a maximum number of palette entry, the signaled palette entry is signaled, wherein the palette index is derived using at least one of an index mode or a copy mode, the index mode is a method of deriving a palette index based on information about palette index run, and the copy mode is a method of deriving a palette index of the current sample using a palette index of a neighboring sample, wherein when at least one sample of the current block uses the index mode, the information about palette index run is encoded to indicate the number of consecutive sample locations with same palette index, and wherein a generated encoded value of the palette index run is selected from one of two encoded types based on a number of bits to use:

a first encoded type, a value of the palette index run is generated using a single encoded element that represents the value of the palette index run as is, a second encoded type, a value of the palette index run is generated using two encoded elements that represent a most significant bit (MSB) value as is and refinement bits as is of the value of the palette index run.

7. The method of claim 6, wherein the predetermined scan order is one of a horizontal traverse scan and a vertical traverse scan, and wherein the horizontal traverse scan is a method in which an odd row of the current block is scanned from left to right and an even row is scanned from right to left and the vertical traverse scan is a method in which an odd column of the current block is scanned from top to bottom and an even column is scanned from bottom to top.

8. The method of claim 6, wherein in restoring each sample of the current sample, if the value of the derived palette index for the current sample is equal to the number of palette entries constituting the palette map of the current block, the current sample is restored based on an escape mode (ESCAPE MODE)

wherein the escape mode is a method of restoring a sample value based on a palette escape value that is additionally signaled without using a palette entry of the configured palette map.

9. The method of claim 8, wherein the escape mode is selectively used based on the number of palette entries constituting the palette map of the current block.

10. The method of claim 9, wherein when the number of palette entries constituting the palette map of the current block is greater than 0, it is allowed to restore at least one sample of the current block based on the escape mode, and wherein when the number of palette entries constituting the palette map of the current block is 0, it is not allowed to restore the current block based on the escape mode.

* * * * *